United States Patent [19]

Reinhardt et al.

[11] Patent Number: 4,993,150
[45] Date of Patent: Feb. 19, 1991

[54] PROCESS FOR PRODUCING CUP TAPPETS FOR RECIPROCATING-PISTON MACHINES

[75] Inventors: Rudolf Reinhardt, Esslingen; Hans Zechmann, Kernen, both of Fed. Rep. of Germany

[73] Assignee: Daimler-Benz AG, Fed. Rep. of Germany

[21] Appl. No.: 393,785

[22] Filed: Aug. 15, 1989

[30] Foreign Application Priority Data

Aug. 24, 1988 [DE] Fed. Rep. of Germany ....... 3828635

[51] Int. Cl.⁵ .............................................. B21K 1/22
[52] U.S. Cl. ........................... 29/888.43; 29/DIG. 48; 29/DIG. 49; 123/90.51; 228/112
[58] Field of Search ................... 29/156.7 B, DIG. 48, 29/DIG. 49, 888.43; 228/112, 114, 200; 123/90.51

[56] References Cited

U.S. PATENT DOCUMENTS

| | | | |
|---|---|---|---|
| 1,468,927 | 9/1923 | Spire | 123/90.51 X |
| 2,055,342 | 9/1936 | Schneider | 29/156.7 B |
| 3,060,560 | 10/1962 | Biehl et al. | 72/267 X |
| 3,657,800 | 4/1972 | Hautala et al. | 228/2 X |
| 4,073,474 | 2/1978 | Hashimoto et al. | 228/112 X |
| 4,251,273 | 2/1981 | Smith et al. | 419/28 |

FOREIGN PATENT DOCUMENTS

| | | |
|---|---|---|
| 1243222 | 6/1967 | Fed. Rep. of Germany . |
| 2059941 | 7/1971 | Fed. Rep. of Germany . |
| 3540882 | 5/1986 | Fed. Rep. of Germany . |
| 3528432 | 2/1987 | Fed. Rep. of Germany . |
| 3542192 | 6/1987 | Fed. Rep. of Germany . |
| 3638270 | 5/1988 | Fed. Rep. of Germany . |

OTHER PUBLICATIONS

F. Technische Stahlsorten, Gewaltz Oder Geschmiedt, pp. 1078, 1082–1083, BD. I., 7. Abschn: Stoffkunde, III Eisen Und Stahl.

Primary Examiner—Joseph M. Gorski
Attorney, Agent, or Firm—Evenson, Wands, Edwards, Lenahan & McKeown

[57] ABSTRACT

A process for the production of cup tappets for reciprocating-piston machines having a pressure plate made from wear-resistant alloyed tool steel and a cup casing, welded to the pressure plate, and made from cheap and cold-extrudable steel utilizes a friction welding process to weld the two parts to one another in a crack-free manner. The cup casing blank is produced by the cold-extrusion process and is carbonized before the welding so that good welding results can thereby be achieved despite the considerable strength differences and cross-sectional differences between the pressure plate and cup casing blanks. As a result of a preheating of the pressure plate, an impairment of the cup casing blank during the frictional heating can be compensated and cracks in the workpiece during or immediately after the welding can thereby be avoided. The pressure plate blank can be designed as a flat round which can be produced by stamping and which projects radially to a pronounced extent relative to the cup casing blank, so that it can be tensioned in an overhand region during the friction welding. The outer overhang containing possible cracks is removed in a subsequent chip-removing, preferably grinding operation.

16 Claims, 3 Drawing Sheets

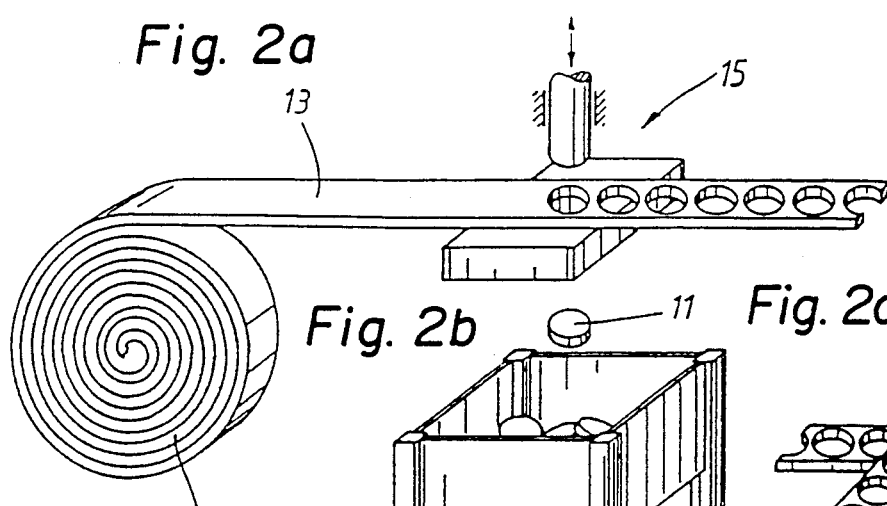
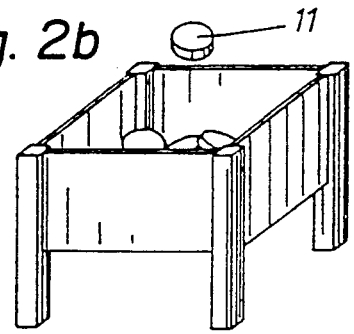
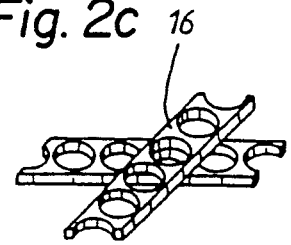
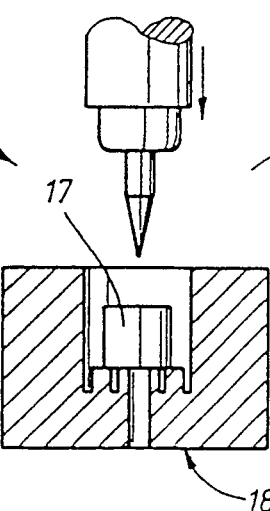
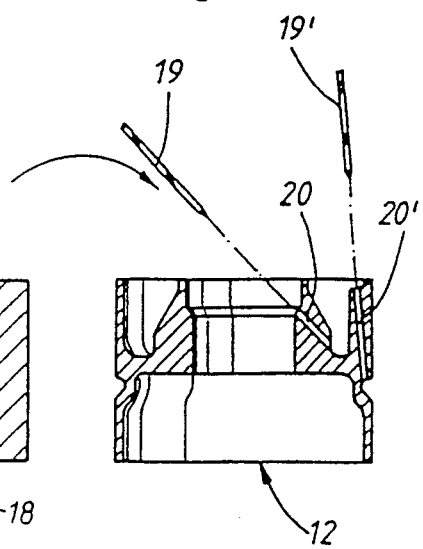
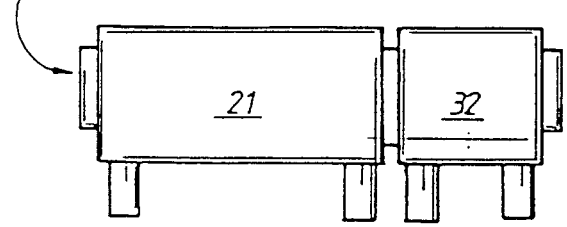
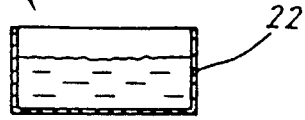

Fig. 4a
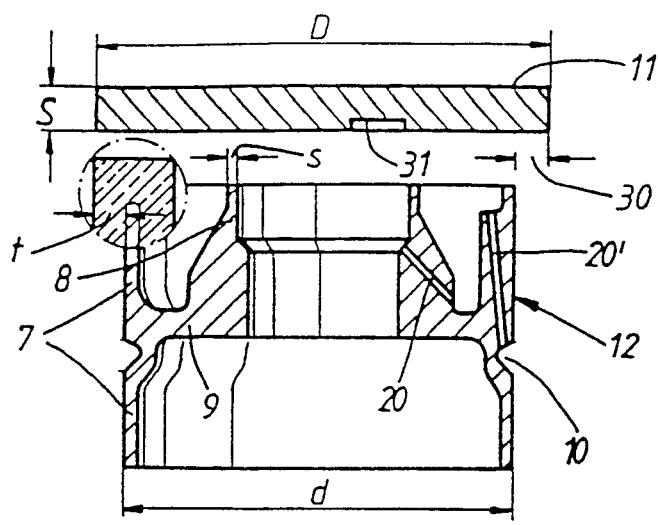
Fig. 4b
Fig. 5
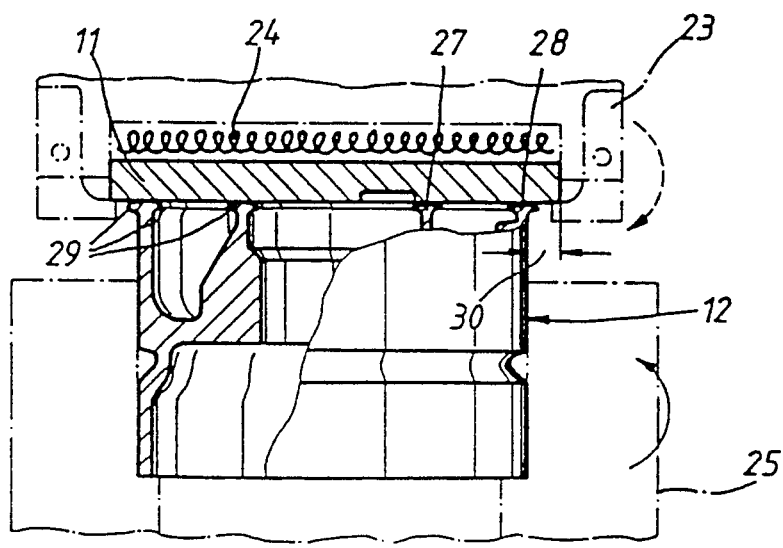
Fig. 6
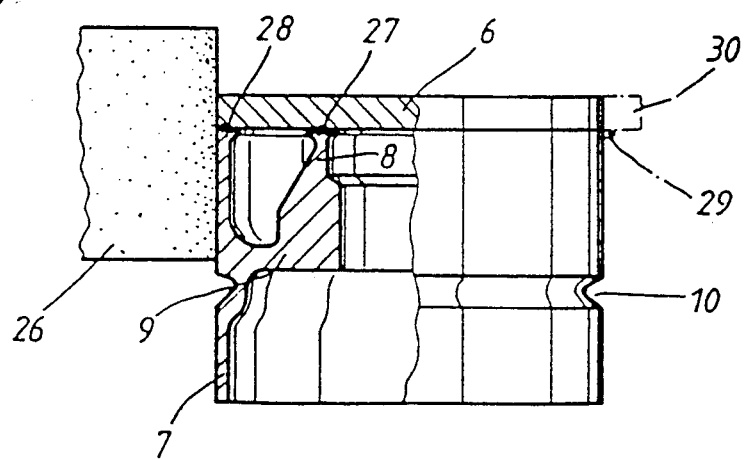

on its outer edge. The pressure-plate blank is

PROCESS FOR PRODUCING CUP TAPPETS FOR RECIPROCATING-PISTON MACHINES

BACKGROUND AND SUMMARY OF THE INVENTION

The present invention generally relates to a process for producing cup tappets for reciprocating-piston machines, and more particularly to a process for reliably preventing cracks in cup tappets.

The production process for tappets which is disclosed by German Published, Unexamined Patent Application (DE-OS) 2,526,656 is intended primarily for those tappets in which the stroke movement is indirectly transmitted to the valve stem of gas-exchange valves via interposed tappet rods and rockers. In this production process, a pressure plate and a cup casing are welded together by electron-beam welding. To secure the mutual positioning of the two individual parts when they are still not welded together, a small peg or a small shoulder, onto which the cup casing is attached in a centered manner, is lathe-turned on the pressure plate.

German Published, Unexamined Patent Application (DE-OS) 3,540,882 shows a cup tappet, in which the stroke movement is transmitted to the valve stem directly, that is to say without interposed tappet rods or rockers. A hydraulic play-compensating element is incorporated in the cup tappet. The pressure plate is made of a wear-resistant tool steel and has an axially extending skirt which forms part of the outer surface of the cup casing on its outer edge. The pressure-plate blank is therefore essentially a bowl-shaped structure. The remaining parts of the cup tappet are produced from cold-extrudable steel and are connected to the bowl-shaped pressure plate by a laser welding seam located in the casing region in an approximately central axial position.

A disadvantage of the two above-noted production processes is that the welding processes used are highly conducive to the formation of cracks especially in the material of the pressure plate. In particular, there is a pronounced quenching effect attributable to the unheated material and therefore a local embrittlement of the material in the welding region, because of the narrowly localized heat input. This, despite the relatively low heat distortions, leads to cracks. Moreover, because of the high vacuum necessary for electron-beam welding, this welding process is very time-consuming and does not allow short cycle times. Finally, the necessary shaping of the pressure plates can be carried out only in a chip-removing manner, a shaping process involving a relatively high outlay. Furthermore, material-cutting shaping processes entail a relatively high loss of material.

Accordingly, an object of the present invention is to develop further the relevant process for the production of cup tappets, while, at the same time, maintaining, if not even reducing the cycle time, to the effect that cracks in the cup tappets can be reliably prevented.

According to preferred embodiments of the present invention, these and other objects are achieved utilizing a friction-welding Process, which is known per se and which works in a very economical way to provide a crack-free welded joint between the cup casing and pressure plate forming the cup tappet. A carbonization of the cup casing ensures an approximately uniform frictional heating despite greatly differing material properties and material cross sections between the two individual parts forming the cup tappet.

The crack-free welded joint provided as a result of carbonization is especially unexpected in that carbon contents above only approximately 0.25% can lead to the formation of cracks during welding. Surprisingly, however, this is not to be observed in the particular use described here.

Because the friction-welding process is adopted, the pressure-plate blank can also advantageously be designed as a simple flat round, thereby considerably reducing the costs for the production of the pressure-plate blanks as well as minimizing resulting waste material. The individual advantageous features of preferred embodiments of the present invention interact to lead to a common outcome in which cup tappets can be produced in a crack-free and economical manner.

In particular, with the process according to advantageous features of preferred embodiments of the present invention, it is also possible to produce cup tappets with two welding seams arranged concentrically one in the other, as are desirable, under certain circumstances, for cup tappets with an incorporated play-compensating element.

Other objects, advantages and novel features of the present invention will become apparent from the following detailed description of the invention when considered in conjunction with the accompanying drawings.

BRIEF DESCRIPTION OF THE DRAWINGS

FIG. 2 shows diagrammatically the production of the rounds for the pressure plates from a strip, FIG. 3 shows diagrammatically the production of the cup casing blanks by the cold-extrusion process with subsequent carbonization, FIG. 4 shows the mutual alignment of the cup casing blank and pressure-plate blank before they are welded together, FIG. 5 shows the friction-welding together of the two parts, and FIG. 6 shows the elimination of the projection and of the outer welding burr by a grinding process.

DETAILED DESCRIPTION OF THE DRAWINGS

Figure 1:
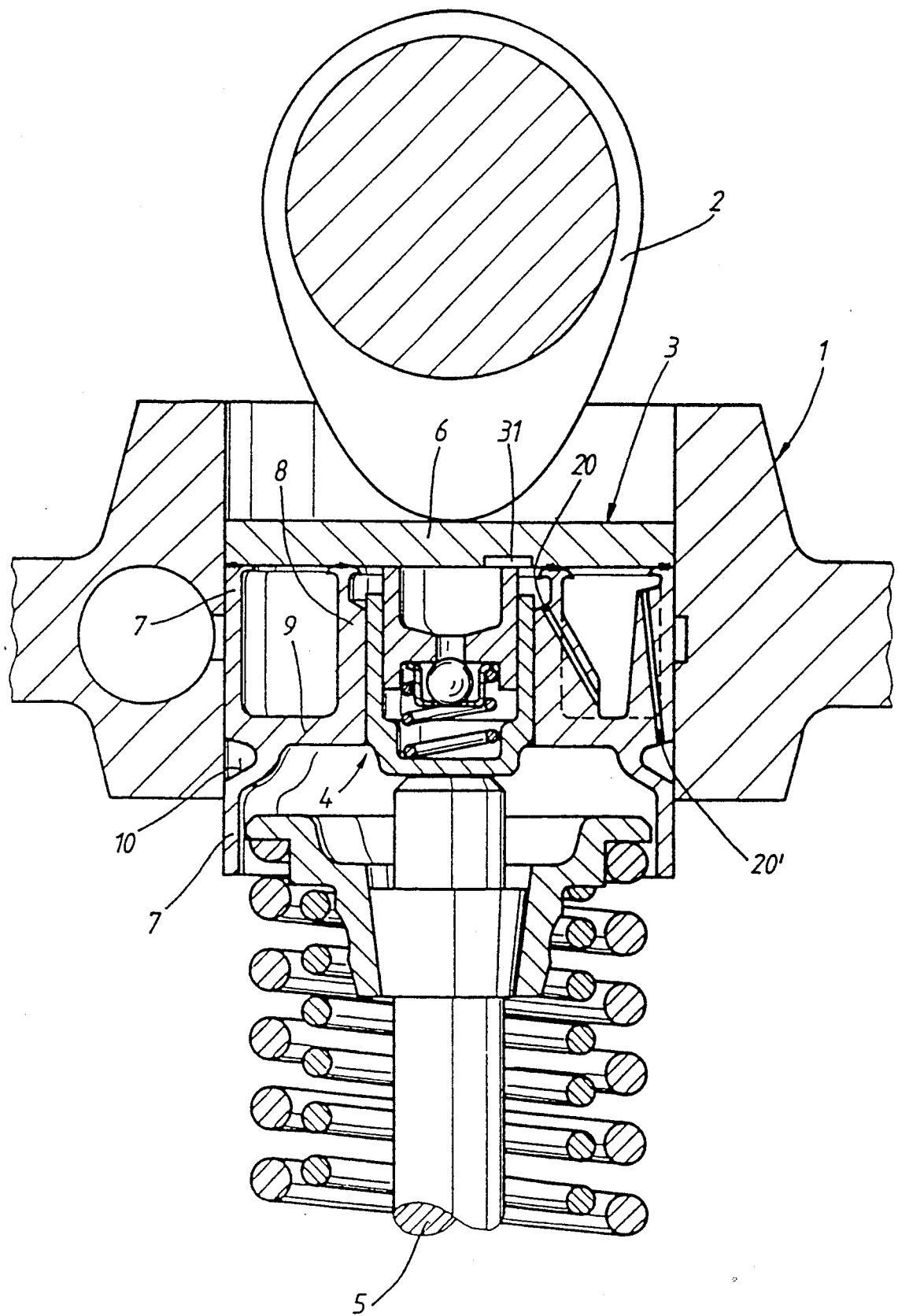
FIG. 1 shows a part cutout from the cylinder head of a reciprocating-piston machine with a cup tappet in the installed state.

The invention is explained further below by means of an exemplary embodiment illustrated in the drawings.

FIG. 1 illustrates a cylinder head 1 with a camshaft 2 mounted rotatably on it. A cup tappet 3 is guided in a cylindrical bore arranged transversely relative to the camshaft 2 with a hydraulic play-compensating element 4 interposed. The cup tappet 3 stresses the valve stem 5 of a gas-exchange valve shown only partially. With the exception of the play-compensating element 4 already mentioned, the cup tappet 3 includes a pressure plate 6 forming the cup bottom and an outer cup casing 7.

To accommodate the play-compensating element 4 mounted in a piston-like manner, an inner cup casing 8 is also provided on the cup tappet 3 via an intermediate floor 9. An essentially incompressible pressure-transmission medium, such as, for example, oil, can be fed to the hydraulic play-compensating element from a lateral oil-supply channel via a circumferential groove 10. The pressure-transmission medium passes from the circumferential groove 10 to the play-compensating element 4 via small oil ducts 20' and 20 incorporated in the cup casing 7 and in the inner cup casing 8 respectively.

In view of the fact that the cup bottom is stressed directly by the cam of the camshaft 2, the pressure plate 6 is formed from wear-resistant alloyed tool steel. Moreover, for reasons of static strength, the pressure plate 6 has a relatively large wall thickness S, which, preferably, is a multiple larger than the wall thickness s of the cup casing 7 as seen in FIG. 4. For weight reasons, the cup casing 7 is made as light as possible and therefore as thin-walled as possible. The alloyed steel with the designation X 210 CrW 12 has proved appropriate as a material for pressure plates of this type. The cup casing 7 with the other parts formed on it in one piece, such as the intermediate floor 9 and the inner cup casing 8, is made from a cheap low-carbon steel so that this part can be produced by the cold-extrusion process and also for price reasons in that steels with a carbon content of below 0.2% can be cold-extruded in an economical way.

Both the pressure plate 6 and the cup casing 7, 8 are first manufactured as separate blanks, and, as mentioned, the cup casing blank 12 is produced largely by the cold-extrusion process. After the two blanks have been welded together, the cup tappet is then subsequently completed and brought to the finished size.

In principle, the process according to preferred embodiments of the present invention can also be used for cup tappets with only one outer cup casing 7 and without a play-compensating element. Furthermore, the process is also applicable to cup tappets with an incorporated play-compensating element, in which the inner cup casing 8 does not need to be connected sealingly to the pressure plate 6.

However, a workpiece which is especially difficult to produce is the exemplary embodiment of a cup tappet in which there are two casing parts, namely the outer cup casing 7 and the inner cup casing 8, which are formed in one piece on the cup casing blank 12 and are arranged concentrically one in the other at a radial distance and which terminate axially flush with one another and are both to be welded sealingly to the pressure plate 6. A further requirement making the production more difficult, this also applying to cup tappets with welding seam, is that the ratio between the wall thicknesses s of the casing parts of the cup casing 7, 8 which are to be together in the welding-seam region and the wall thickness S of the pressure plate 6 should be very approximately 0.25 in the exemplary embodiment illustrated.

Because of this very low wall-thickness ratio, but additionally because of the greatly strength properties of the different materials, the cup tappet apparently unsuitable for the use of a friction-welding process, because the very hard and solid pressure plate wears the thin casing parts during the frictional heating, without itself thereby heating up to the welding heat. To make it possible to use the cold-extrusion process for the shaping of the cup casing, the cup casing preferably is comprised of a relatively soft steel which yields all the more under heating. C 15 steel has proved appropriate as a steel easily workable by the cold-extrusion process. Good results are also obtainable with the steels 16 MnCr 5 or 15 Cr 3.

Despite the use of such a cold-extrudable steel and despite the large differences in wall thickness, it is possible to employ the friction-welding process which initially does not appear to be feasible. To this end, the cup casing blank 12 is carbonized to a carbon content of at least 0.3% before the welding together. The higher the carbon content, the better; however, in view of costs in terms of time and energy, the aim will be to keep the carbonization as low as possible. In a practical example, a carbonization to a carbon content of about 0.6% led to useful results, in particular to satisfactory friction welding.

This must seem especially paradoxical inasmuch as in welding work, irrespective of the type of welding process, relatively high carbon contents in the steel workpieces involved have always been avoided. Crack formations are to be expected beginning at a carbon content of about 0.25% and increase with an increasing carbon content. Where the carbonization depth during carbonization is concerned, at least approximately 30% of the wall thickness s of the cup casing prevailing in the welding region should be covered, so that only a mean uncarbonized region of approximately 40% remains. It is most expedient to continue the carbonization as far as the middle of the wall, so that the carbonization depth t amounts to approximately 50% of the wall thickness s.

The carbonization of the cup casing blanks 12 can be carried out directly by the bulk process, that is to say with the cup casing blanks in random positions, this being an efficient and cheap process. After the carbonization, the cup casing blanks are cooled to room temperature. Although friction welding is also possible in the hardened state of the cup casings, nevertheless better welding results are achieved in the merely carbonized state and with slow cooling from the carbonization temperature at least to the austenitizing temperature.

The process for producing the cup casing blanks 12 will be explained with particular reference to FIGS. 3A–3E. First, bolts 17 are cut to length from round bar stock of a suitable material, for example C 15 steel, and can serve as blanks for the production of the cup casing blanks 12. In certain circumstances, these can even be hollow bolts or thick-walled tubular portions. They are inserted in a specific position into a cold-extrusion die 18 and pressed into the desired form by a single-stage or multi-stage cold-extrusion operation. For complicated forms, intermediate annealing can sometimes also be necessary. The details of this are known.

Before the cup casing blank 12 is welded together with the pressure plate, the oil ducts 20 and 20' also have to be drilled, as indicated in FIG. 3C by the drills 19 and 19', because the oil ducts 20 and 20' are subsequently no longer accessible axially by means of drilling tools. Moreover, it is important for the perfect operation of the cup tappet that all the cavities be absolutely free of particles. The circumferential groove 10 can be rolled in by the cold-extrusion process, but can also be lathe-turned in a chip-removing manner. At all events, the cup casing blank 12 has to be machine-finished in the still soft state to some final dimensions which can be obtained by grinding. Thereafter, the cup casing blanks prepared in this way are dumped into steel baskets and introduced into a pusher-type furnace with a gas atmosphere having a carbonizing effect, as symbolized by the carbonizing furnace 21 in the illustration according to FIG. 3D. Of course, a batch furnace can also be used instead of a pusher-type furnace.

After the baskets with the carbonized cup casing blanks contained in them have come out of the furnace 21, in the exemplary embodiment shown in the illustration according to FIG. 3D, these are introduced into a cooling chamber 32 which is unheated, but is filled with the same gas, effective as an inert gas, as in the furnace 21, and in which the cup casing blanks can cool slowly to a temperature below the austenitizing temperature. To accelerate the further cooling and to prevent scaling, the parts can be immersed in a quenching bath 22 preferably filled with water, and despite the rapid cooling in the final cooling stage, the parts remain moderately hard in the carbonized region.

In view of the exact mutual alignment of the parts to be welded together for the friction-welding process in the necessary welding apparatus, there is no need for a mutual centering of the parts by means of corresponding shoulders on the pressure plate. A corresponding centering shoulder would even be harmful to the friction welding, because the free formation of the welding burr would be impeded thereby. The pressure-plate blank 11 can therefore be designed as a round which is flat in the welding region. The pressure-plate blank 11 can thus be stamped out economically and, above all, also in a material-saving way from a strip, namely the strip 13 in FIG. 2, or from a metal sheet. Despite the high strength of the material used, a simple stamping tool for stamping out a round disc is perfectly justifiable, even if it has to be sharpened or renewed at relatively short intervals in respect of its cutter fitting.

Because of the possibility of clamping the pressure-plate blank 11 securely during the friction welding, the outside diameter D of the pressure-plate blank is selected approximately 5 to 15% larger than the outside diameter d of the cup casing blank 12 to form a projection 30 as seen in FIG. 4. Care must be taken to ensure that a welding burr 29 of hook-shaped cross-section, as seen in FIG. 6, can form freely radially outside and radially inside the annular welding seam 27 and 28. If necessary, the round blank can have an outer contour differing from the circular form, so that it can be fastened positively in the circumferential direction.

However, the projection 30 of the pressure-plate blank 11 relative to the cup casing blank 12 has another reason. The region of this relatively large projection 30 contains possible stress cracks and deformations which are attributable to the stamping of the rounds 11 and which, under certain circumstances, may be propagated during the welding. However, stress cracks typically start from the outer circumference of the round 11 and are restricted to the region of the projection 30 so that the cracks do not reach parts in the immediate radial region of the outer welding seam 28. Further, these possibly crack-prone parts in the region of the projection 30 are eliminated during one of the last work operations, so that the remaining workpiece is completely free of cracks.

The production of the rounds 11 will be discussed briefly in the following with reference to FIG. 2. A strip 13 wound up to form a roll 14 is fed to a stamping machine 15 indicated diagrammatically, in which, with the strip 13 advancing in steps, the rounds 11 are stamped out intermittently and collected in a box. The remaining perforated strip of material is divided into handy pieces by means of shears which follow, but which are not shown, and is collected as relatively valuable recyclable scrap. In this case, the material waste is substantially less than if the pressure-plate blanks 11 had to be lathe-turned from a round bar in a chip-removing manner. Before the welding together, it is merely necessary to make a small depression 31, as seen in FIG. 4, arranged eccentrically on the inside of the pressure plate, and this can be done by means of an embossing operation or even in a chip-removing way. For the finished cup tappet, the pressure plate 6 has to be hardened, whereas the starting material for the Pressure-plate blanks is normalized in its delivery state. The necessary hardening of the pressure plate 6 can take place in the state of the pressure-plate blanks 11, that is to say before the friction welding, or in the welded-together state, in which case the cup casing 7, 8 would necessarily also have to pass through this process step. In both cases, satisfactory welding results can be achieved.

The blanks prepared in this way, namely the pressure-plate blank 11 on the one hand and the cup casing blank 12 on the other hand, are clamped in pairs in a corresponding clamping chuck 23 for the pressure-plate blank 11 and clamping chuck 25 for the cup casing blank 12 of a friction-welding machine. At the same time, the parts are aligned exactly concentrically relative to one another and retained with a high force in the corresponding chucks 23, 25, so that they cannot slip or shift either in the circumferential direction or in the axial direction. With the rotation of at least one of the parts relative to the other or with respective opposite directions of rotation, the parts are driven at high speed and pressed together axially, and as a result of friction heat up very sharply and assume a pasty, weldable state.

At the same time, as previously mentioned, welding burrs 29 of hook-shaped cross-section form on the casing parts 7 and 8. Because of the carbonization of the cup casing blanks 12, the pressure-plate blank 11 also reaches the necessary welding temperature at the welding points. After this welding temperature has been reached, the parts 11, 12 are braked very quickly to a stop and pressed together axially with a high force, so that pressure welding takes place.

Despite the carbonization of the cup casing blank 12 before the friction welding, the cup casing blank 12 is nevertheless impaired in terms of both the strength properties of its material and its workpiece cross-section in comparison with the Pressure-plate 11 which, in this respect, is very hard and solid. In order to compensate for this impairment of the cup casing blank 12 during the heating, it is expedient to preheat the pressure-plate blank 11 immediately before the friction welding. As indicated by way of example in FIG. 5, this can be brought about by a heating which is incorporated in the clamping chuck 23 and which is obtained there by a heating coil 24. Instead of this or even in addition to this, there can be, in the immediate vicinity of the clamping chuck 23, a heatable magazine for pressure-plate blanks 11, from which one blank at a time can be transferred into the clamping chuck 23 very quickly and over short transport distances. With the material pairing mentioned and the carbonization found to be expedient, a relatively moderate preheating to approximately 150° to 350° C., especially a preheating to approximately 300° C., has proved appropriate.

In the heating of the workpiece to the welding heat as a result of friction, the uniform preheating of the pressure-plate blank 11 compensates not only a certain impairment of the cup casing blank 12 associated with this, but also equalizes a temperature gradient within the pressure-plate blank 11 especially put at risk in this respect, because the material used for it has a particularly high carbon content. The friction welding itself also contributes to ensuring that the temperature gradients unavoidably occurring are only moderate, because, as a result of the frictional heating, heat is introduced over a wide space into the workpieces involved. This moderate temperature gradient during the friction welding largely avoids the danger of crack formation, even though the cup casing blank 12 has been carbonized in a region where it would normally lead to cracks during welding.

To complete the prevention of cracks, the finish-welded cup tappet 3 can be tempered immediately away from the welding heat after the friction welding. Specifically, the cup tappets 3 will be reheated, that is to say tempered, to approximately 450° to 550° C. for approximately 2.5 to 3.5 hours. A tempering to 500° C. for a period of 3 hours has proved expedient here. However, adherence to these parameters is not particularly critical. For example, in a continuous furnace, specific treatment times and, because of an unavoidable temperature drop in the region of the feed and extraction orifices, also exact treatment temperatures cannot be adhered to exactly in any case. At all events, it should be ensured that, even if reheating is to be adopted, intermediate cooling between the welding heat and the reheating is avoided. However, since the parts are relatively small and can cool correspondingly quickly in the ambient air, where appropriate, a rapid transfer of the workpieces from the friction-welding machine into the tempering furnace is advisable.

To make it possible to eliminate the projection 30 of the pressure-plate blank 11 welded to the cup casing blank 12 and the outer welding burr 29, according to FIG. 6 a circumferential grinding by means of a grinding wheel 26 is provided. In the still unhardened state of the pressure-plate blank 11, in some circumstances this could even be lathe-turned, but the last portion of a projection located near the outer welding seam 28 is very hard purely as a result of the welding operation and must always be ground. The material of the pressure plate 6, which is relatively tough and high-strength even without hardening, can best be removed efficiently and reliably by means of a grinding operation. To prevent unnecessary material heating and allow high removal capacities this is best carried out by the wet-grinding process. This is appropriately a rough grinding with a relatively coarse-grain grinding wheel 26. Insofar as the pressure plate has not already been hardened as a blank, this must be made up, as mentioned above, before its finish-machining as a complete part. The precision machining and the grinding to the finished size in the diametral region can be carried out by means of a subsequent finish grinding. The pressure-plate top side interacting with the camshaft can thereafter also be cambered where appropriate, if this is desirable.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Process for producing cup tappets for reciprocating-piston machines, the cup tappets including a cup casing and a pressure plate forming a cup bottom of the cup casing, the pressure plate being made of a blank of wear-resistant alloyed tool steel with a wall thickness greater by a multiple than a wall thickness of the cup casing, the cup casing being welded to the pressure plate and being made from a blank of cold-extrudable steel having a carbon content of less than 0.2%, wherein the pressure plate and the cup casing are manufactured as separate blanks, the cup casing being manufactured substantially by a cold-extrusion process, the pressure plate and cup casing blanks being welded to one another at a welding region in the desired relative position during a welding step, and subsequently the cup tappets being machine finished, the process comprising the steps of:
   (a) forming the pressure plate as a round which is flat at a region to be welded and has an outside diameter which is approximately 5% to 15% larger than an outside diameter of the cup casing such that a radial projection extending beyond a circumference of the cup casing is formed;
   (b) carbonizing the cup casing to a carbon content of at least about 0.3% with a carbonizing depth of at least approximately 30% of the wall thickness of the cup casing prevailing at a region to be welded to the pressure plate; then
   (c) friction-welding the pressure plate to the cup casing by rotating the pressure plate relative to the cup casing, while clamping the pressure plate at its radial projection, thereby forming an outer welding burr and
   (d) removing in chips the radial projection of the pressure-plate blank and the outer welding burr.

2. Process according to claim 1, further including the step, prior to the carbonizing step, of forming the cup casing from two casing parts, including on inner cup casing part and an outer cup casing part and arranging concentrically one in the other such that the two casing parts terminate axially flush with one another, wherein the friction welding welds the two casing parts to the pressure-plate blank simultaneously.

3. Process according to claim 1, wherein a ratio between the wall thickness of the cup casing to be welded in the welding region and the wall thickness of the pressure plate is less than one third.

4. Process according to claim 1, wherein the cup-casing is one of 16 MnCr 5 steel and 15 Cr 3 steel.

5. Process according to claim 1, wherein the cup casing is C 15 steel.

6. Process according to claim 1, wherein the pressure-plate forming step comprises stamping the round from one of a strip and a metal sheet.

7. Process according to claim 1, wherein the pressure-plate is X 210 CrW 12 steel.

8. Process according to claim 1, wherein the step of carbonizing the cup-casing comprises a bulk processing with the cup-casings in random positions.

9. Process according to claim 1, wherein the carbonizing step for the cup-casing includes carbonizing the cup casing to a carbon content of about 0.6%.

10. Process according to claim 1, wherein the carbonizing step for the cup-casing includes carbonizing the cup casing to a carbonization depth of approximately 50% of the wall thickness of the cup casing prevailing at the welding region.

11. Process according to claim 1, further including the step of cooling the cup-casing to about room temperature after the cup casing is carbonized.

12. Process according to claim 11, wherein the cooling step includes cooling the cup casing from a carbonization temperature at least to an austenitizing temperature slowly.

13. Process according to claim 1, further including the step of preheating the pressure-plate to approximately 150° to 350° C. immediately before the friction welding step.

14. Process according to claim 13, wherein the temperature during the preheating step is approximately 300° C.

15. Process according to claim 1, further including the step of tempering, after the friction welding step, the welded pressure plate and cup casing immediately away from any welding heat.

16. Process according to claim 1, wherein the removing step includes wet-grinding off the radial projection of the pressure plate and the welding burr.

* * * * *